United States Patent
Lin et al.

(10) Patent No.: US 6,530,008 B1
(45) Date of Patent: Mar. 4, 2003

(54) METHOD FOR MANAGING A DATABASE FOR STORING VARIABLE SIZE DATA RECORDS USING FIXED SIZE BUCKETS

(75) Inventors: Sheng Ling Lin, Lisle, IL (US); Hongguang Li, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,356

(22) Filed: Nov. 29, 1999

(51) Int. Cl.[7] .............................................. G06F 12/00
(52) U.S. Cl. ..................... 711/171; 707/101; 707/200
(58) Field of Search ............... 707/1–206; 711/170–173

(56) References Cited

U.S. PATENT DOCUMENTS

| | | | | | |
|---|---|---|---|---|---|
| 5,440,732 A | * | 8/1995 | Lomet et al. ................... | 707/1 |
| 5,517,632 A | * | 5/1996 | Matsumoto et al. ........ | 395/441 |
| 5,542,087 A | * | 7/1996 | Neimat et al. .............. | 395/600 |
| 5,630,119 A | * | 5/1997 | Aristides et al. ............ | 348/906 |
| 5,757,900 A | * | 5/1998 | Nagel et al. ................. | 379/219 |
| 5,893,086 A | * | 4/1999 | Schmuck et al. .............. | 707/1 |
| 5,960,431 A | * | 9/1999 | Choy ............................ | 707/7 |
| 5,963,937 A | * | 10/1999 | Yamasaki et al. ........... | 707/201 |
| 6,067,547 A | * | 5/2000 | Douceur ..................... | 707/100 |
| 6,115,705 A | * | 9/2000 | Larson .......................... | 707/3 |
| 6,173,415 B1 | * | 1/2001 | Litwin et al. ............... | 711/114 |

* cited by examiner

Primary Examiner—John Breene
Assistant Examiner—Leslie Wong

(57) ABSTRACT

The present invention provides an improved method for managing a toll-free number database within a storage medium. The method provides for extending space for record data within the storage medium. Memory space within the storage medium is allocated into buckets for storing records in accord with record size. A database-index is provided for mapping each record to a bucket. A bucket-index is provided for identifying buckets that may receive new records. If a bucket becomes full or approaches full occupancy, a new bucket is added to the database and the bucket-index is updated accordingly. An occupancy-index may be provided for indicating the amount of available memory in each bucket.

10 Claims, 5 Drawing Sheets

10

METHOD FOR MANAGING A DATABASE FOR STORING VARIABLE SIZE DATA RECORDS USING FIXED SIZE BUCKETS

TECHNICAL FIELD

This invention relates to the field of telecommunications services. Specifically, this invention is to an improved method for managing the storage of toll-free records in a telecommunications database.

BACKGROUND OF THE INVENTION

A telecommunications system includes a complicated network of switches and modules in continual interaction with one another. Due to heavy service demands by a large number of telecommunications systems users, it is important that network trafficking be efficient and reliable. Within a telecommunications system, components interact for call processing and for transferring information. For example, components may communicate with one another to request information needed to process a call, provide a service, or update a record. Components that operate or respond slowly or fail may very likely adversely affect call processing through other parts of the system and contribute to an overall increase in call processing traffic.

Telecommunications equipment includes storage media, such as magnetic or optical disks, configured for storing information, including a toll-free number database. A toll-free number database is composed of a number of records. Typically, a toll-free record within a toll-free number database includes information specific to the corresponding toll-free number. A toll-free record may include information regarding such functions as call processing, on-line menus, call forwarding, messaging, and a variety of other applications. Thus, toll-free records vary not only in content but in size as well.

The organization of toll-free records within the toll-free database may vary from system to system. For example, some systems organize the toll-free number database by record size. In one such system, a plurality of memory locations are allocated within the storage medium. Each memory location corresponds to a predetermined range of record sizes. For storing and locating records within a memory location, each record may be treated as a fixed-size record of the largest size within the corresponding range of record sizes. Records may be identified by a subgroup of the record content, referred to as a record-key. For example, in a toll-free database, a record-key may consist of the toll-free number. Records may be located within storage locations through algorithms, such as a hashing algorithm, based upon the relative magnitude of the record-key. Records may also be stored in accordance with such algorithms. If a new record is assigned the space currently occupied by an existing record, a linked list may be utilized for storing the over-lapping information. Of course, a toll-free number database may be organized in any one of a number of other ways.

Systems in which toll-free records are sorted and stored in accordance with record size include a storage medium. Preferably, storage medium space is divided into fixed partitions. Each partition may be referred to as a bucket. Preferably, each bucket is assigned a record size range. For example, a storage medium may have three buckets, A, B, and C. In this example, toll-free records of less than 80 bytes may be stored in bucket A, records of 81 to 2000 bytes may be stored in bucket B, and records of 2001 to 5000 bytes may be stored in bucket C. New records are added to database buckets in accord with record size. It is not uncommon for such a database to have forty or more buckets, each corresponding to one of forty or more record size ranges.

As bucket occupancy increases and buckets become "full", it may become necessary to provide additional space in the storage medium for adding new records. It should be recognized that while additional space is provided, it is highly desirable to continue to efficiently manage the database. In the prior art, efficient management of the database is maintained by reallocating and extending the partition size for the "full" buckets. Thus, newly added records continue to be stored in one of three buckets, A, B, and C, while bucket sizes are adjusted as necessary to accommodate the new records.

The prior art has demonstrated that call processing may be adversely affected while the buckets in a storage medium are reallocated and extended. Typically, the records are temporarily written to a supplementary storage medium such as a tape so the buckets can be reallocated and extended within the primary storage medium. The records are then rewritten to the primary storage medium and the database is restored. It should be recognized that the database is out of commission through re-partitioning. The prior art confirms that a lot of time is required to repartition a telecommunications storage medium. The procedure may take several days or weeks for a large database. Having a toll-free database out of commission for such an extensive amount of time is extremely burdensome for a live telecommunications service control point.

Thus, there is recognized in the telecommunications field a need for an improved method for managing the storage of records in a toll-free database.

SUMMARY OF THE INVENTION

The present invention is directed at an improved method for managing a telecommunications database of variable sized toll-free records. The invention comprises allotting a plurality of buckets within a storage medium. A record size limitation is assigned to each bucket, thus defining an acceptable range of record sizes for each bucket. A minimum free-memory capacity threshold is determined for each bucket. Records are identified within the database by a record-key, such as a designated (i.e., toll-free) number. A database-index identifies each record-key within the database and the bucket in which the corresponding record is stored. The database also includes a list identifying the buckets that may presently accept new records. Preferably, the buckets are identified by memory location and a designated range of record sizes, providing a bucket-index. The bucket-index may also indicate whether the free memory capacity of a bucket is greater than or less than the minimum free-memory capacity threshold or may specify the free memory capacity of the bucket.

Prior to adding new records or modifying existing records, the size of the new/modified record is determined. The bucket-index is accessed and the record is assigned/written to the appropriate bucket.

If the unoccupied memory of a bucket is less than a minimum free-memory threshold, a new bucket is added to the database and the bucket-index is updated accordingly. The database-index is updated as new records are added to or removed from buckets.

In a further embodiment, an occupancy-index is provided for identifying buckets which may be consolidated with buckets having the same record size limitation.

DETAILED DESCRIPTION OF THE PREFERRED EMBODIMENT

The preferred embodiment of the present invention will be described with reference to the telephone switching system 10 illustrated in FIG. 1. However, it is to be understood that the present invention is applicable to any telephonic switching system in which a database of records is periodically updated.

Figure 1:
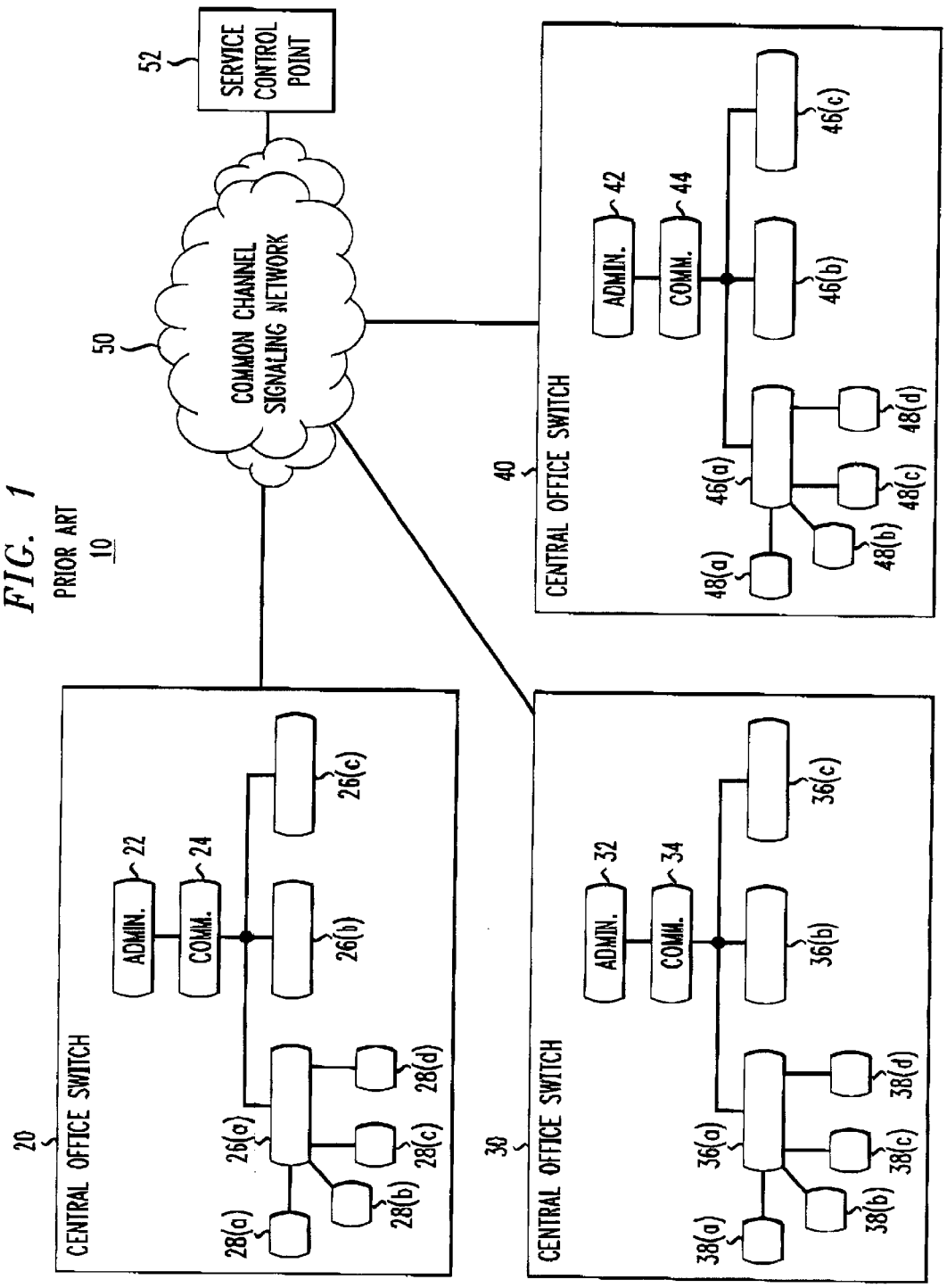
FIG. 1 is an illustration showing select components within a telecommunications switching network of the prior art.

The telephonic switching system 10 illustrated in FIG. 1 includes a plurality of central office switches 20, 30, and 40, in communication with a common channel signaling network 50. Network 50 is also in communication with service control point 52, explained in more detail below.

Each central office switch may include a number of components for phone switching and switching management for interconnecting communication channels and retrieving and storing data. For example, central office switch 20 includes an administration module 22, a communication module 24, and switching modules 26(*a*), 26(*b*), and 26(*c*). In the present example, the switching modules are connected to a plurality of remote modules. Illustratively, switching module 26(*a*) is in communication with remote modules 28(*a*), 28(*b*), 28(*c*), and 28(*d*).

Figure 2:
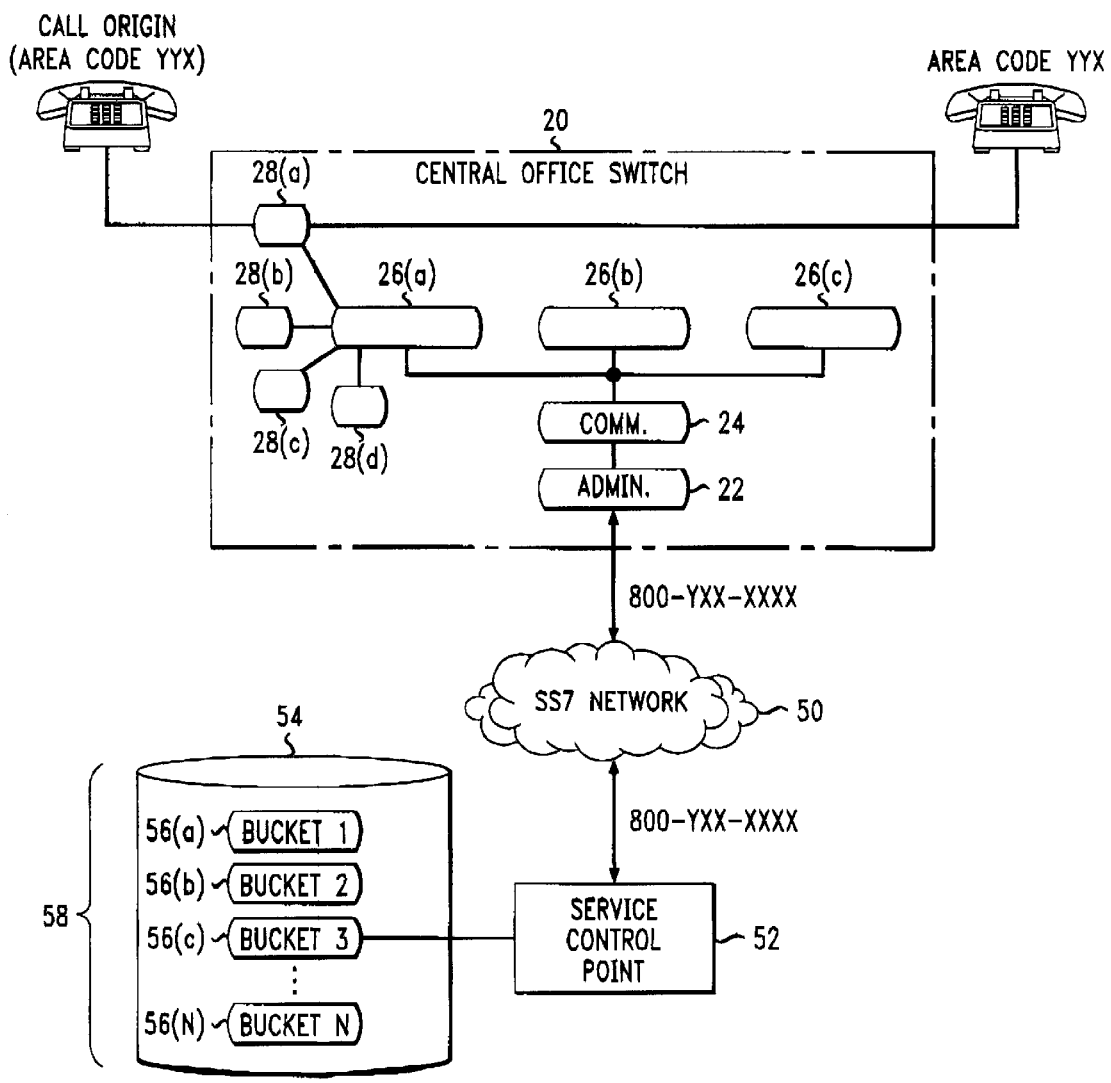
FIG. 2 is an illustration showing additional details of the telecommunications switching network shown in FIG. 1.

FIG. 2 is a further illustration of the telephone switching system 10 where, for exemplary purposes, the common channel signaling network 50 is an SS7 network and service control point 52 includes a storage medium 54. Storage medium 54 may be a disk or other device capable of storing data electronically. Storage medium 54 stores a database 58 organized into a number N of sections or groups, 56(*a*), 56(*b*), 56(*c*), . . . 56(N). Each section or group may be referred to as a bucket.

In the present example, database 58 is configured as a toll-free number database. The toll-free number database includes records. Each record includes information specific to a toll-free number. Records are identified within the database by a record-key, such as a designated (i.e., toll-free) number. Typically, a toll-free number record includes information for processing a toll-free call as requested by the toll-free number owner. Such processing may vary from a relatively simple routine to an extensive set of instructions. Thus, the range of record sizes in a toll-free database is typically broad.

In one example, the toll-free number record may simply instruct the system to forward the call to a long distance carrier for further processing. Thus, the record may be relatively small, such as less than 80 bytes. In another example, the toll-free number record may provide routing instructions based upon the dialing number, date, day, or time of the call. Such a record may be large, requiring It up to 220 kilobytes of memory in database 58.

While the toll-free database may be structured according to any one of a number of organizational schemes, it is known in the art that efficient use of disk space may be achieved by allocating space, i.e., buckets, in accord with record size. In such an organizational scheme, disk space is pre-allocated into sections, referred to as buckets, for holding a plurality of records. Preferably, a record size limitation is assigned to each bucket, thus defining an acceptable range of record sizes for each bucket. Such an organizational scheme allows records to be located efficiently, as discussed above. Of course, other organizational schemes are possible. The method of the present invention is not limited for use with only databases having an organizational scheme based upon record size.

Referring again to FIG. 2, for the present example it may be assumed that database 58 has 40 fixed-size buckets. Illustratively, toll-free records may be sorted into buckets within the database as follows:

| Bucket no. | Record size range (in bytes) |
| --- | --- |
| 1 | Up to 80 |
| 2 | 81 to 144 |
| 3 | 145 to 500 |
| . | . |
| . | . |
| . | . |
| 38 | 32,001 to 64k |
| 39 | 64,001 to 128k |
| 40 | 128,001 to 220k |

Each record is stored in the bucket having records of corresponding size, i.e., within the record size range designated for the respective bucket. Records are identified within the database by a record-key, such as a designated (i.e., toll-free) number. A database-index lists each record-key within the database and identifies the bucket in which the corresponding record is stored.

The status of each bucket is maintained in a database that includes a list identifying the buckets that may presently accept new records. The buckets are identified by the designated record size range/limitations, providing a bucket-index. Preferably, buckets are not assigned overlapping ranges or other limitations. It is also preferred that the bucket-index covers all acceptable record sizes.

Figure 3:
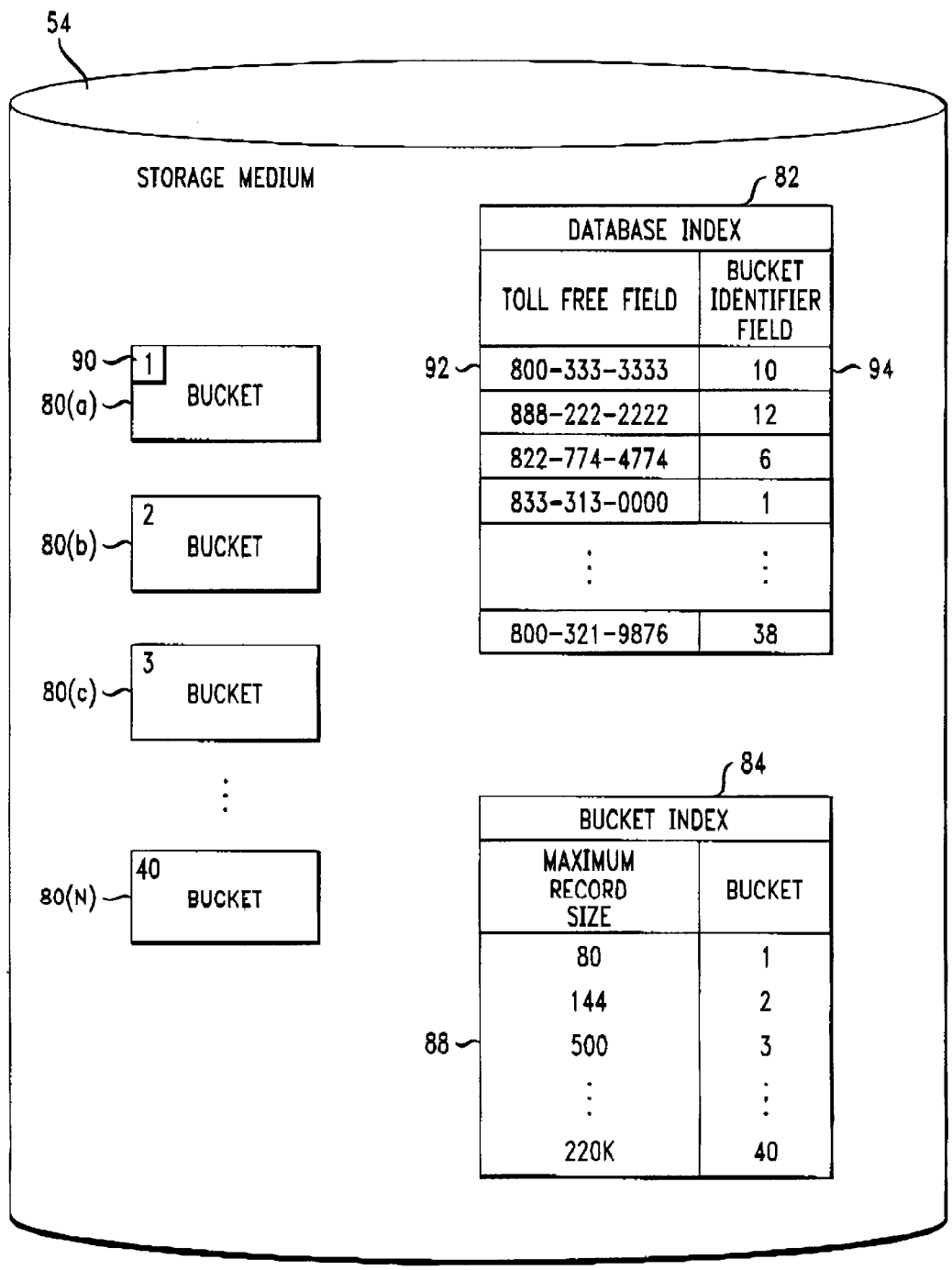
FIG. 3 is an illustration of a database for storing toll-free records within a storage medium, in accordance with one embodiment of the present invention.

FIG. 3 is an illustration of a toll-free database having a plurality of buckets, 80(*a*), 80(*b*), 80(*c*), . . . 80(N). In this example, the database includes 40 buckets and each bucket is identified by a reference numeral 90. The database also includes a database-index 82 that includes a designated (toll-free) field 92 and a bucket identifier field 94. The database-index identifies the bucket in which each record is stored, as discussed above. A bucket-index 84 is also provided. The bucket index indicates the maximum record size 88 designated for each bucket.

In a further embodiment, the database includes an index that records the present occupancy of each bucket, referred to as a bucket-occupancy index. Bucket occupancy may be recorded as an absolute value or a percentage and may be expressed with respect to how full a bucket is or how much free-memory is available.

There are a large number of possible toll-free numbers. The following table represents all possible toll-free number combinations:

| | |
|---|---|
| 0 | 800 - $X_9X_8X_7$ - $X_6X_5X_4X_3$ |
| 1 | 888 - $X_9X_8X_7$ - $X_6X_5X_4X_3$ |
| 2 | 877 - $X_9X_8X_7$ - $X_6X_5X_4X_3$ |
| 3 | 866 - $X_9X_8X_7$ - $X_6X_5X_4X_3$ |
| 4 | 855 - $X_9X_8X_7$ - $X_6X_5X_4X_3$ |
| 5 | 844 - $X_9X_8X_7$ - $X_6X_5X_4X_3$ |
| 6 | 833 - $X_9X_8X_7$ - $X_6X_5X_4X_3$ |
| 7 | 822 - $X_9X_8X_7$ - $X_6X_5X_4X_3$, | where the second and third numbers must be identical, the first three digits cannot be "899" or "811," and $X_9$ cannot be a "0" or a "1". Thus, there are 64 million possible toll-free number combinations.

As more records are added to a bucket or information is added to records, buckets continue to fill. To avoid overfilling a bucket and/or overwriting record data, a less-than-maximum occupancy threshold is set and maintained for each bucket. For example, a minimum free-memory threshold may be set at 23%. Thus, records may be written to such a bucket provided that less than 77% of bucket memory is occupied. If the occupancy of the bucket is at 77% or higher, the service control point will not allow additional records to be written to the bucket. Rather, additional memory space is allocated for a new bucket and new records of sizes that are within the record size limitation of the "full" bucket. In the present invention, additional storage space is allocated for a new bucket without affecting existing buckets. Thus, adverse effects on call processing are minimized.

As discussed above, the database of the preferred embodiment has three indexes for managing the allocation of records within buckets: a database-index, a bucket-index, and an occupancy-index.

Also as discussed above, the database-index lists each record-key within the database and identifies the bucket in which the corresponding record is stored. Of course, there may be numerous record-keys (records) within the database, requiring a long database-index. In the preferred embodiment, the size of the database-index is minimized by limiting the total number of buckets in the database to less than 255, requiring only one byte for identifying a bucket.

In the preferred embodiment, the database-index has 8 arrays, one array for each combination of the first three digits of possible toll-free numbers, i.e.,800, 822, 833, etc. Each array has 8 million bytes, i.e., the total number of possible combinations of the last seven digits of all possible toll-free numbers. The last seven digits corresponds to a database offset value within the array. In such an array, the first three digits of the toll-free number may then provide the address of a pointer to the bucket that includes the record. In the preferred embodiment, the second field is shared by each array, as illustrated below:

Thus, in the preferred embodiment, only 64 million bytes are needed to represent the mapping of each toll-free number to a bucket.

The bucket-index identifies the buckets that may presently accept new records. The buckets are identified by the assigned record size limitation. Preferably, the bucket size limitation is represented by no more than 4 bytes. When the amount of unoccupied memory of a bucket falls below the predetermined free-memory threshold, the "full" bucket is removed from the bucket-index, a new bucket is added, and the bucket index is updated to indicate the presence of a new supplemental bucket for receiving records. In an alternate embodiment, the bucket-index indicates whether the available memory of every bucket is greater than or less than the minimum free-memory capacity threshold.

The occupancy-index indicates the occupancy of all of the buckets in the database. Preferably, the occupancy-index indicates the maximum capacity of each bucket and the amount of space that is (or is not) available. The need for creating new buckets or, as explained below, consolidating buckets, may be ascertained from the occupancy-index.

Thus, the preferred embodiment of the present invention includes indexes for locating records among buckets, identifying buckets in which new records may be added, and whether a new bucket is to be added. The indexes allow the database within a storage medium to be organized and maintained for avoiding having to remove a database from a telecommunications system for extending storage space.

Figure 4:
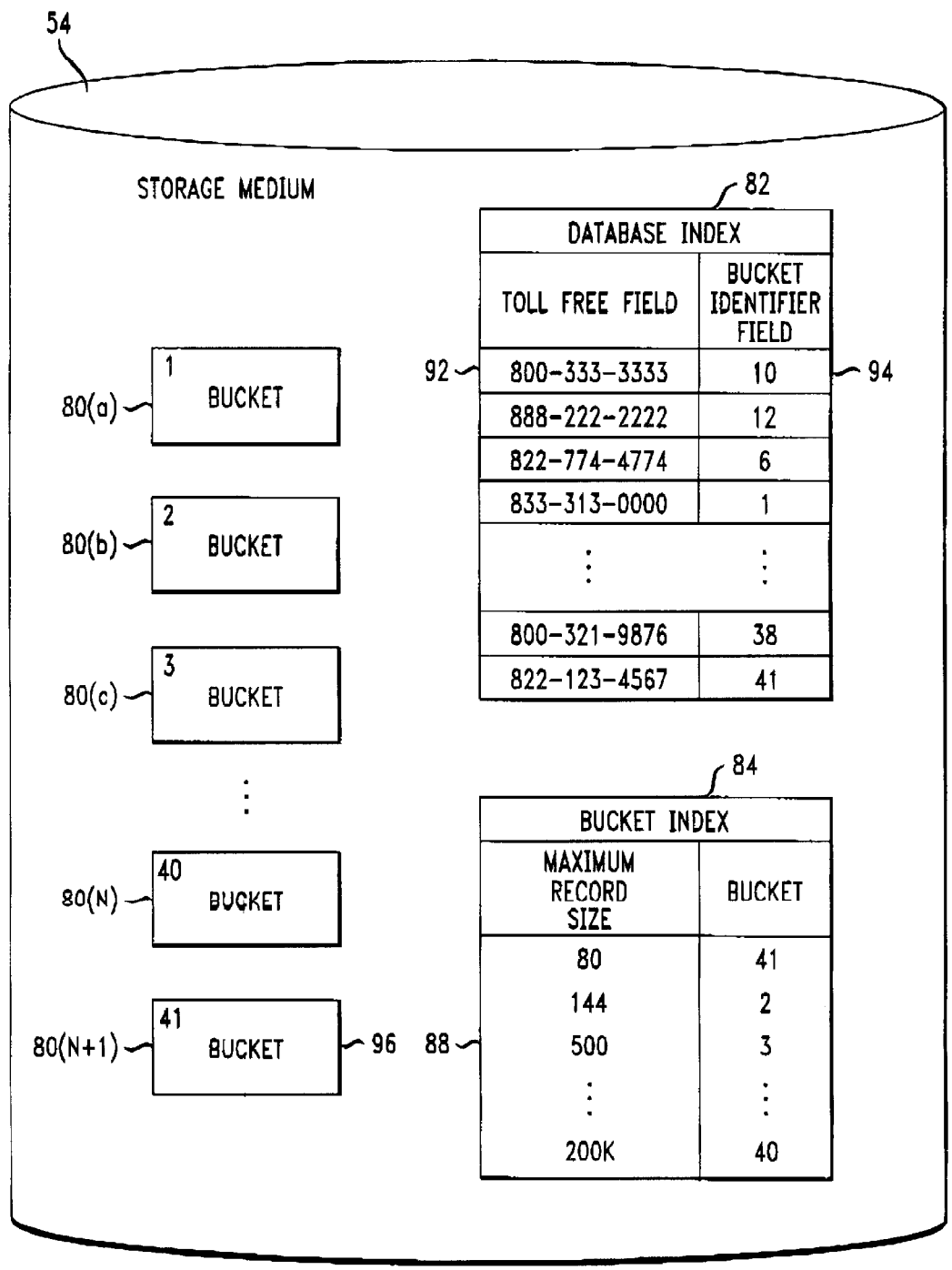
FIG. 4 is an illustration showing the database of FIG. 3 extended in accord with one embodiment of the present invention.

FIG. 4 is an illustration of the database of FIG. 3 in which the amount of unoccupied memory of bucket "1" is less than the minimum free-memory threshold. The database further includes a new bucket 80(N+1), having 79 bytes, identified by its designated number 822-123-4567. Because the new bucket 80(N+1) and bucket "1" 80(*a*) are both designated to receive records within the same record size range, the new bucket may be referred to as supplemental to bucket "1". As shown, the new bucket 96 is added to the bucket-index for indicating that it may receive additional records. The database-index 82 indicates that the new record is located in new bucket 41. The bucket-index indicates that the new bucket 41 is available for receiving new records of 80 bytes or less. As illustrated, the record corresponding to designated number 800-333-3333 remains in bucket "1 ".

In a further embodiment, the occupancy-index is utilized to determine whether records from a plurality of buckets may be consolidated to a fewer number of buckets. As described above, the occupancy-index indicates the occupancy of all of the buckets in the database. Preferably, the occupancy index indicates the maximum capacity of each bucket and the amount of space that is (or is not) available.

A record owner may delete or edit their record and/or change the size of their record. As records are removed from a bucket, memory space frees-up. It is desirable to maintain

| Last 7 Digits | Offset | 800 | 822 | 833 | 844 . . . |
|---|---|---|---|---|---|
| 200-0000 | 0 | bucket-12 | bucket-85 | bucket-122 | bucket-9 |
| 200-0001 | 1 | bucket-55 | bucket-154 | bucket-88 | buket-23 |
| 200-0002 | 2 | . . . | | | |
| 200-0003 | 3 | | | | |
| . | | | | | |
| . | | | | | |
| . | | | | | |
| 999-9999 | 7999999 | bucket-7 | bucket-55 | bucket-57 | bucket-23 | efficient use of memory space by consolidating records into fewer buckets. Thus, the occupancy-index may indicate that records within the same record size range may be consolidated from two buckets to one bucket. For example, an occupancy-index for the database of FIG. 5 may provide:

| BUCKET | OCCUPANCY |
|--------|-----------|
| 1      | 40%       |
| 2      | 67%       |
| 3      | 58%       |
| .      | .         |
| .      | .         |
| .      | .         |
| 40     | 46%       |
| 41     | 20%       |

Figure 5:
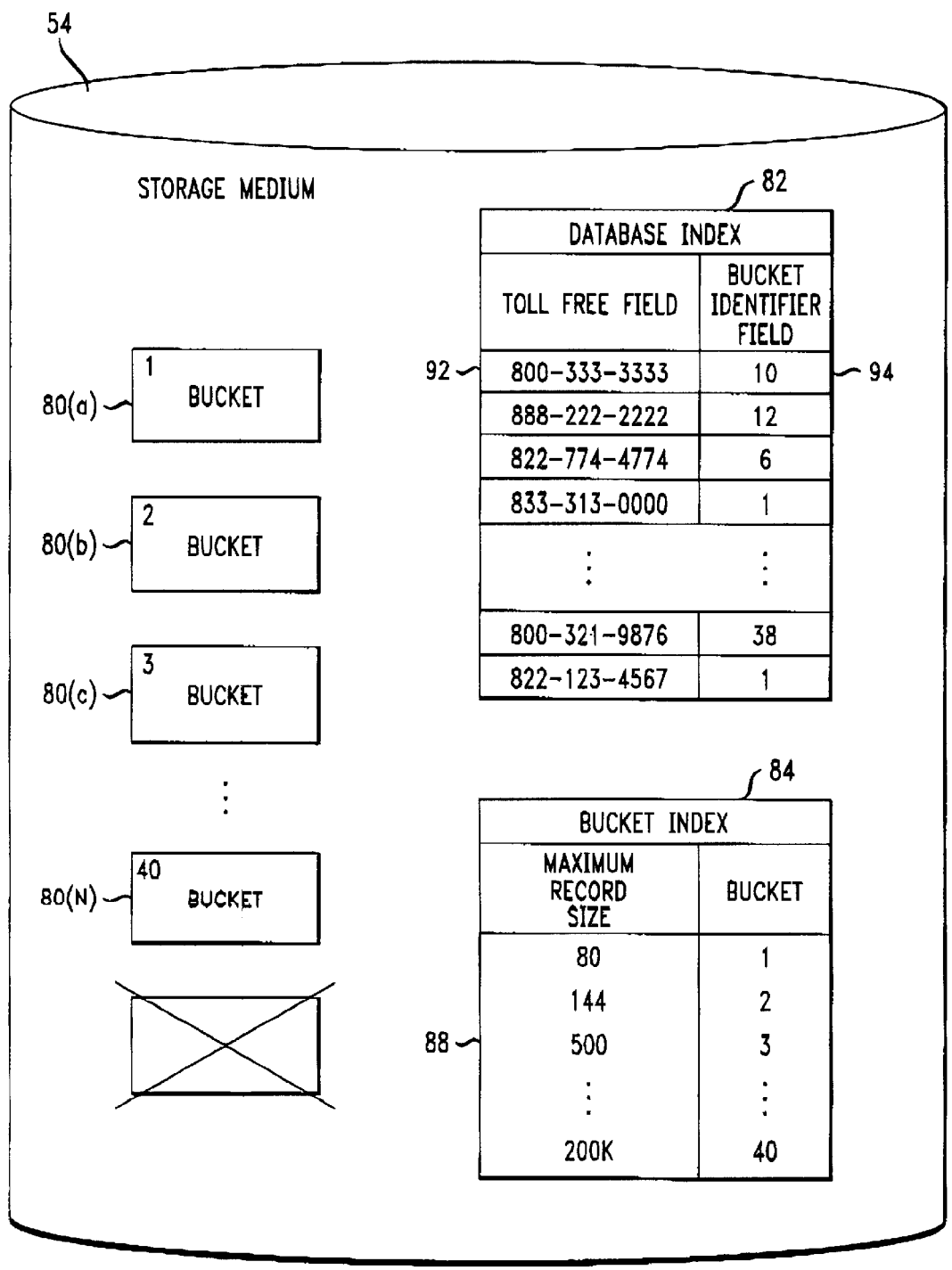
FIG. 5 is an illustration of the database of FIG. 4 having consolidated buckets in accordance with a further embodiment of the present invention.

The occupancy-index shown above indicates that records have been removed from bucket 1. In the example shown above, buckets 1 and 41 both store records of 80 bytes or less. Based upon information provided by the occupancy-index, the records of bucket 41 may be consolidated with the records of bucket 1. As a result of consolidation, the memory space for bucket 41 is freed, and the occupancy-index is updated to reflect that bucket 1 is 60% full (assuming, in this example, that the overall capacity of buckets 1 and 41 is the same). FIG. 5 is an illustration showing the database of FIG. 4 after consolidation.

Thus, the present invention provides an improved method for managing a database of toll-free records. Records are stored in buckets in accord with record size so that records may be located efficiently. As buckets become full, additional memory space is provided for new buckets. New records may be added at the additional memory space without reallocating existing buckets in the storage medium. Thus, new records may be added to a database as existing buckets remain full and storage medium space does not have to be reallocated, minimizing the effects on call processing.

It is to be understood that the above-described embodiments are merely illustrative of the principle of the invention and that many variations may be devised by those skilled in the art without departing for the scope of the invention. It is, therefore, intended that such variations be included within the scope of the claims.

We claim:

1. An improved method for managing a database of variable sized data records said method comprising:
   allotting a plurality of fixed-size buckets, each comprising a segment of memory of fixed extent, within a data storage medium;
   designating a data record size limitation for each of said plurality of buckets;
   providing a bucket-index for indicating the data record size limitation for each of said plurality of buckets;
   selecting, for each of said plurality of buckets, a free-memory threshold defining a minimum quantity of unoccupied memory space remaining in said bucket;
   determining the quantity of unoccupied memory space for each of said plurality of buckets; and
   adding an additional bucket, comprising a segment of memory of fixed extent, to said plurality of buckets if the quantity of unoccupied memory space for a one of said plurality of buckets is not greater than said free-memory threshold for said one of said plurality of buckets.

2. The method of claim 1 further comprising:
   providing at least one data record and determining the size of said at least one data record;
   selecting one of said plurality of buckets based upon said determined size of said at least one data record and said bucket-index;
   storing said at least one data record in said selected bucket; and
   providing a database-index for indicating that said at least one data record is stored in said selected bucket.

3. The method of claim 1 further comprising:
   providing an occupancy-index within said database for indicating the quantity of unoccupied memory space for each of said plurality of buckets; and
   consolidating two or more of said plurality of buckets based upon the designated record size limitation, said occupancy-index, and said free-memory threshold for each of said plurality of buckets.

4. The method of claim 2 wherein said at least one data record is comprised of a record-key corresponding to a first toll-free number, said method further comprising:
   identifying said at least one data record within said selected one of said plurality of buckets by said record-key.

5. The method of claim 3 wherein said step of providing an occupancy-index comprises:
   indicating the quantity of unoccupied memory space for each of said plurality of buckets as a percentage of the memory capacity of each of said plurality of buckets.

6. The method of claim 1 comprising:
   indicating the data record size limitation for each of said plurality of buckets as a maximum number of bytes; and
   defining a plurality of non-overlapping data record size ranges based upon said maximum number of bytes.

7. A method for inserting a plurality of new data records in a telecommunications database, said method comprising:
   allotting a plurality of fixed-size buckets, each comprising a segment of memory of fixed extent, within a data storage medium;
   determining the quantity of unoccupied memory space for each of said plurality of buckets;
   assigning a data record size limitation for each of said plurality of buckets;
   determining the size of one of said new data records;
   storing the one of said new data records in one of said plurality of fixed-size buckets based upon the determined size of the one of said new data records and the assigned data record size limitation of each of the plurality of buckets; and
   allotting at least one additional bucket, comprising a segment of memory of fixed extent, within the data storage medium if the unoccupied memory space of at least one of said plurality of buckets is less than an associated unoccupied memory space threshold.

8. The method of claim 7 further comprising:
   providing a database-index for indicating where each of said data records is stored in said plurality of buckets, a bucket-index for indicating the data record size limitation for each of said plurality of buckets, and an occupancy-index for indicating the quantity of unoccupied memory space for each of said plurality of buckets in the telecommunications database.

9. An apparatus for managing a telecommunications database, said apparatus comprising:

a plurality of buckets, each comprising a segment of memory of fixed extent, having a plurality of telecommunications records stored therein and wherein each bucket is designated to store telecommunications records within a predetermined telecommunications record range size; and a least one additional bucket, comprising a segment of memory of fixed extent, supplementary to one of said plurality of buckets for storing a plurality of telecommunications records wherein said at least one additional bucket is designated to store telecommunications records within the predetermined telecommunications record range size designated for said one of said plurality of buckets.

10. The apparatus of claim 9 comprising:

a database-index for indicating where each of said data records is stored in, said plurality of buckets, a bucket-index for indicating the data record size limitation for each of said plurality of buckets, and an occupancy-index for indicating the quantity of unoccupied memory space for each of said plurality of buckets.

* * * * *